SINGLE GUN COLOR TELEVISION BEAM DEFLECTING SYSTEM

Filed Dec. 19, 1956 2 Sheets-Sheet 1

INVENTOR.
Herbert E. Welch
BY
Smith, Olsen, Baird and Miller
Attys.

INVENTOR.
Herbert E. Welch
BY
Smith, Olsen, Baird and Miller
Attys.

2,972,014

SINGLE GUN COLOR TELEVISION BEAM DEFLECTING SYSTEM

Herbert E. Welch, 4601 43rd St., Lubbock, Tex.

Filed Dec. 19, 1956, Ser. No. 629,371
13 Claims. (Cl. 178—5.4)

The present invention relates to a dot-sequential color television system. More particularly, the invention relates to a single-gun color picture tube of the type having a target screen made up of a plurality of horizontally arranged color phosphor strips and specifically to an improved method of and apparatus for deflecting the electron beam into registry with the different color strips during each horizontal line scan.

In cathode ray tubes of the type described, sets of three different color phosphor strips are arranged on the screen respectively in the area of the trace defined by the electron beam during each horizontal line scan wherein for each set of different color strips a first color strip is located at the mean position of the corresponding horizontal line trace, and a second color strip and a third color strip are located immediately adjacent to and respectively above and below the first color strip. In order to produce a registry upon all three color strips of a set during the period of each horizontal line scan, it is required that the electron beam be deflected many times in the vertical direction, alternately, above and below the normal horizontal line trace of the electron beam.

It has been proposed that this required color deflection of the electron beam be accomplished in the scanning section of the tube, but in this arrangement there is the problem of controlling deflection of the beam to produce accurate registry on the proper color strip at the proper time. Another proposal for accomplishing color deflection is to employ a color grid immediate to the electron target, that is, employ a fine wire grid mounted close to the screen at which color deflection of the electron beam is controlled by varying the potential between the grid wires. By way of illustration, in a color tube for which the color strips on the electron target run in sequence, red, green, blue, green, red, green, blue, etc., a wire is aligned with each blue strip and a wire is aligned with each red strip. The "blue" wires are joined to a common electrical terminal and the "red" wires are connected to a common electrical terminal. When the "red" and "blue" wires are biased so that there is a zero potential therebetween, the electron beam sweeping the screen will be caused to strike the target within the boundary of a green strip; when the wires are biased so that the "red" wires are positive with regard to the "blue" wires, the electron beam is deflected and caused to strike the target within the boundary of a red strip; and when the wires are biased so that the "blue" wires are positive with regard to the "red" wires, the electron beam is deflected and caused to strike the target within the boundary of a blue strip.

In order to conform to the standards approved by the Federal Communications Commission, it is necessary that the polarity between the "red" and "blue" wires of the grid arrangement be reversed at a rate corresponding substantially to the color sub-carrier frequency, that is, at approximately 3.58 megacycles per second. Due to the capacitance between the wires in the color grid arrangement, which is in the order of 1,000 micro-microfarads, one practical means for accomplishing switching at this frequency with a minimum use of power is to employ a resonant charging circuit. However, to be effective this arrangement must provide an output of approximately 20 watts which is so large so as to require care to be taken in order to minimize radiation effects at the color sub-carrier frequency.

Another disadvantage of the resonant charging arrangement is that the switching signal provided thereby is of a sine wave form, which means that one peak of the sine wave must be used for the deflection of a first color, the other peak for a second color and the zero cross-over level for the third color. Since the rate of change in the amplitude of the wave is maximum in the last named case, the dwell time for the third color, that is, the time during which the beam is incident upon the particular third color strip, is shorter than for the other two colors. In this circumstance, assuming other things to be equal, the displayed brightness of the third color is not as intense as for the other colors. In an attempt to equalize the registry periods and thereby equalize the intensity of the three colors, use has been made of short duration beam gating pulses, utilized so that the beam is gated on only at the extreme peaks of the sine wave and at the zero cross-over; this technique of blanking the electron beam for a great portion of its horizontal sweep accomplishes the purpose but it reduces the overall brightness of the composite color pictures to a level that is appreciably less than the maximum brightness possible in a dot-sequential color television system.

A further disadvantage of the resonant charging technique, as presently employed, arises from the fact that the voltages between the wires of the color grid and the electron target are constantly changing, and the degree of change required for effective color switching is so great as to actually influence focusing of the beam and to cause focusing thereof to be somewhat irregular.

It is an object of the present invention to provide an improved arrangement for deflecting the electron beam in a color television display tube of the type described.

A more specific object of the invention is to provide in a single-gun color television tube of the type described, an improved color switching arrangement for increasing the effective brightness of the picture to near the theoretical maximum while reducing the switching power requirements and the radiation problems resulting therefrom.

A specific object of the invention is to provide in a single-gun, horizontal phosphor-strip color television tube, a vertical color deflection arrangement located in the scanning section of the tube and immediate to the electron gun and responsive to a reversing sequence stair-step voltage by means of which the electron beam is stepped vertically in both directions from the horizontal line scanning path so as to be directed approximately towards each of the three color strips in a reversing sequence, and to provide a color switching wire grid immediate to the phosphor screen which is responsive to a sine wave voltage for reversing the polarity between the adjacent wires of the grid at a rate equal to and in phase with the stair-step voltage applied to the color deflection arrangement in order to further deflect the electron beam onto the individual color phosphor strips.

The advantages of this arrangement are that the electron beam may be held fixed on a particular phosphor for a longer time interval than heretofore possible, whereby for a given electron beam density the brightness of the picture display is increased. A further advantage is that by carrying out an approximating color deflection in the scanning section of the tube and a final directory color deflection at the wire grid, the power requirement of the color deflection arrangement is made relatively small and the radiation effects are insignificant. Additionally, as deflection in the scanning section requires lower potentials, than does deflection at the wire grid, it is believed that the total power requirement of this arrangement is substantially less and the accuracy of color registry is substantially greater than in other color switching arrangements proposed for color picture tubes of this type.

Further features of the invention pertain to the particular arrangement of the circuit elements of the cathode ray tube arrangement, whereby the above outlined and additional operating features thereof are obtained.

The invention, both as to its organization and methods of operation, together with further objects and advantages thereof, will be best understood by reference to the following specification taken in conjunction with the accompanying drawings, in which.

Figure 1:
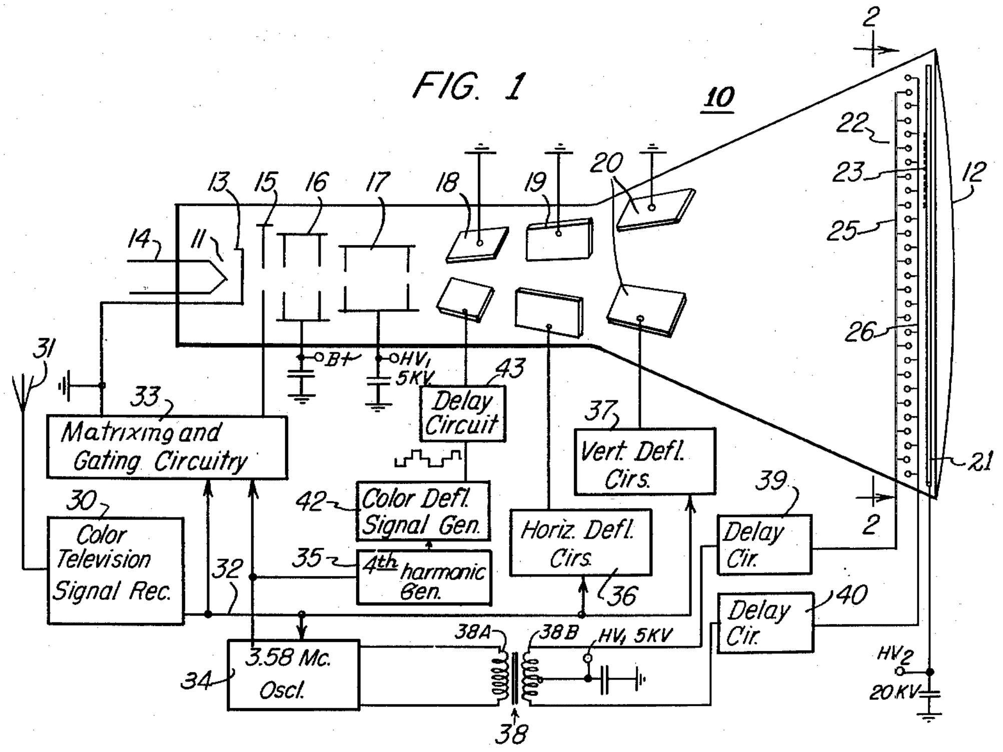
Figure 1 is a diagrammatic representation of a single-gun color picture tube and the operating circuits therefor embodying the principles of the present invention.

Referring to the drawings and considering first the arrangement of Figure 1, there is shown therein a cathode ray tube 10 having an electron beam source 11 at one extremity thereof, and a viewing area or target screen 12 at the other extremity thereof. Specifically, the electron beam source 11 comprises a thermo-emissive cathode 13 provided with a filament heater 14 surrounded by a grid or control electrode 15 for modulating the stream of electrons emitted by the cathode, a first anode 16, for providing a preliminary acceleration to the electron beam, and second anode 17 for focusing the beam and for providing a final acceleration to the electron beam.

Immediately in front of the second anode is positioned a pair of vertical color-deflection plates 18, the diagram being considered as viewed from the side. Beyond the set of color-deflection plates 18 is a set of horizontal deflection plates 19 in quadrature to the plates 18 for producing the horizontal line scan of the electron beam emitted from the cathode 13; and beyond the plates 19 is a second set of the deflecting plates 20 in quadrature to the plates 19 which are utilized to produce the vertical scanning deflection of the electron beam. It is understood that sets of plates 18, 19 and 20 are merely the electrostatic representations of means for producing deflection of the electron beam and that magnetic deflection coils may be utilized as well for producing the same deflections accomplished by the deflection plates shown.

Figure 2:
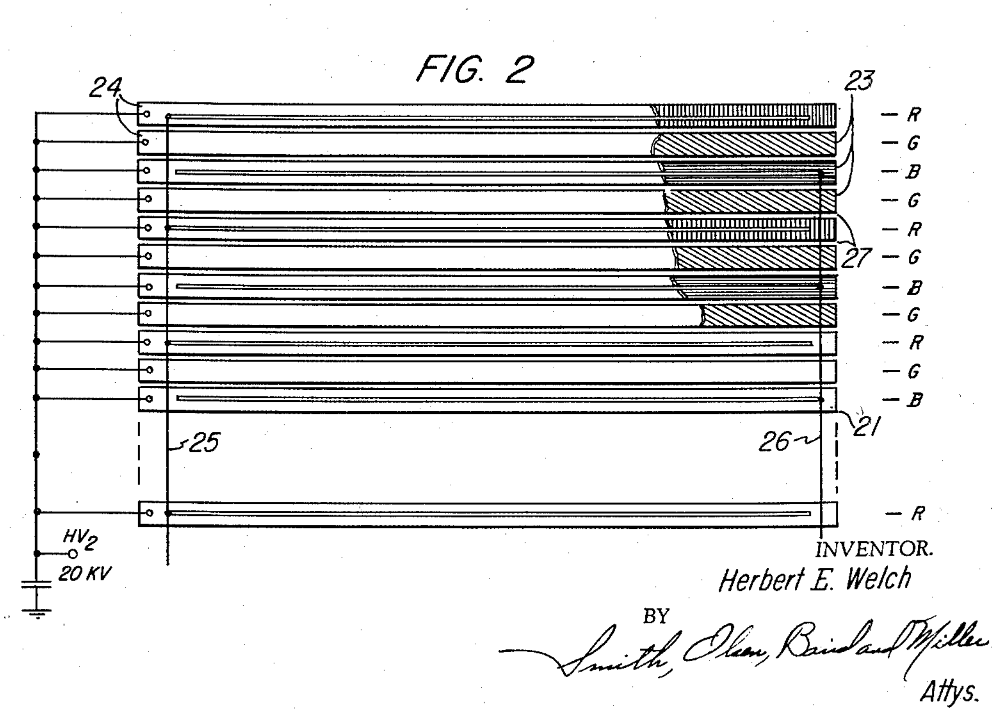
Figure 2 is a plan view of the phosphor strip screen and the color grid wire arrangement therefor taken along the lines 2—2 of Figure 1.

In the viewing area 12 and positioned to be impinged by the electron beam is a target electrode 21, and closely spaced therefrom in the electron beam path is a color grid 22 of parallel wires. The target electrode 21 consists of a plurality of phosphor strips 23 deposited side-by-side on a thin plate of glass or other transparent material. As best shown in Figure 2, the phosphor strips are laid down in horizontal pattern in a repeated color-sequence, such, for example, as a reversing color-sequence with a green strip between each red and blue strip. The width of the individual color strips should be such that a group of three thereof is of a total width substantially equal to the width of one picture element and such that at least 228 of such picture elements are produced in each horizontal line and that 525 lines of such picture elements are produced per frame. Additionally, the phosphor strips may be closely spaced apart, one from another by spacers 27 in order to accommodate changes in focusing resulting from changes in the deflection or scanning angle of the electron beam. The spacing between the strips is determined in accordance with the standards given above with regards to the width of the individual color strips.

In order to make the entire target area conductive so that it may be maintained at a uniform potential irrespective of the electrical charges thereon, the exposed surfaces of the phosphor strips are coated with a layer 24 of conductive material, such as aluminum.

The color switching grid 22 is made up of two sets of interlaced grid wires which are parallel to one another and parallel to the phosphor strips 23 on the target 21. Specifically, one set of grid wires 25 is made up of wires which are parallel to and aligned with the "red" phosphor strips on the target 21; and the other set of grid wires 26 is parallel to and aligned with the "blue" phosphor strips on the target 21. The distance separating the grid wires from the phosphor strips of the target electrode 21 is not critical and is determined by the magnitudes of the accelerating potentials, the color switching deflection potentials, and the average potential difference between the grid wires and the coating 24 on the backs of the phosphor strips of the target electrode.

Considering now the manner in which the elements of the cathode ray tube are connected, and referring specifically to Figure 1, a television receiver 30 derives its signal from an antenna 31 and the output television signal is impressed on the conductor 32 thereof and is applied to a number of circuits including the matrixing and gating circuit 33, by means of which color signals are applied to the grid 15. In order to perfect operation of the matrixing and gating circuitry 33, the color frequency "burst" in the color television signal is tapped from the output 32 to drive a 3.58 megacycle oscillator 34 which applies a color sub-carrier frequency signal to the circuit 33 and to a fourth harmonic generator 35. A horizontal deflection circuit 36 is synchronized from the horizontal synchronizing pulses of the signal on conductor 32 in order to provide to the horizontal deflection plates 19 a conventional sawtooth deflection wave of a frequency of 15,750 cycles per second; and a vertical deflection circuit 37 is synchronized from the vertical synchronizing pulses tapped from the signal on conductor 32 in order to provide to the vertical deflection plates 20 a sawtooth deflection wave of a frequency of 60 cycles per second.

The resonant circuit for driving the sets of grid wires 25 and 26 of the color switching grid 22 is comprised of an inductor 38B, which is actually the secondary winding of a transformer 38 and which is center-tapped to a high voltage and is driven by the oscillator 34 through the primary winding 38A at the color sub-carrier frequency of 3.58 megacycles.

Specifically, the set of grid wires 25 is connected through a delay circuit 39 to the one terminal of the winding 38B and the other set of grid wires 26 is connected through a delay circuit 40 to the other terminal of the winding 38B. The winding 38B is center-tapped to approximately 5 kilovolts in order to establish a voltage reference for the post-deflection acceleration potential of about 15 kilovolts applied between the center tap and the conductive coating 24 of the target electrode 21.

The delay circuits 39 and 40 are identical and are provided to compensate for the transit time of the color modulated electrons from the control grid 15 to the color switching grid 22 thereby to synchronize the color switching potentials at the color switching grid 22 with the color information pulses applied at the control grid 15.

The output from the 3.58 megacycle oscillator 34 is also applied to a fourth harmonic generator 35 wherein the fourth harmonic of the color sub-carrier frequency, that is, a signal of approximately 14.32 megacycles, is generated and applied to a color deflection signal generator 42. In the color deflection generator 42 the fourth harmonic signal is shaped to provide a reversing sequence stair-step rectangular wave voltage having a frequency of 3.58 megacycles per second. The rectangular wave voltage from the color deflection generator 42 is applied through a delay circuit 43 to the deflection plates 18 in order to cause the electron beam to be deflected during the course of a horizontal line sweep in the vertical direction, alternately, above and below the horizontal sweep path. The delay circuit 43 is utilized to synchronize the color deflection voltage applied to the plates 18 with the color information pulses applied at the control grid 15 and is substantially identical to the delay circuits 39 and 40 except that the time delay inserted is less than that inserted by the delay circuits 39 and 40.

Figure 3A:
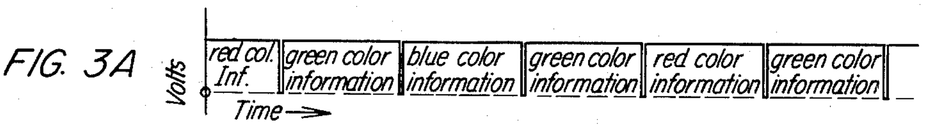
Figures 3A to 3D, inclusive, show the various voltages effective upon an electron beam during a portion of one horizontal line scan and the path that the electron beam traces on the cathode ray tube screen.

Considering now the operation of the arrangement shown in Fig. 1 in deflecting a color modulated electron beam to produce a color display on the viewing area of the cathode ray tube 10, there is provided at the control grid 15 thereof a beam of electrons modulated at the fourth harmonic of the color sub-carrier frequency with color information signal pulses as shown in Fig. 3A, so that the electron beam is segmented into bursts of color information signals in the sequence of red, green, blue, green, red, green, etc. Accordingly, it is necessary to make provision of means for deflecting the beam of electrons so that the respective color information bursts thereof are directed to and strike the corresponding color strips at the target electrode 21.

Figure 3B:
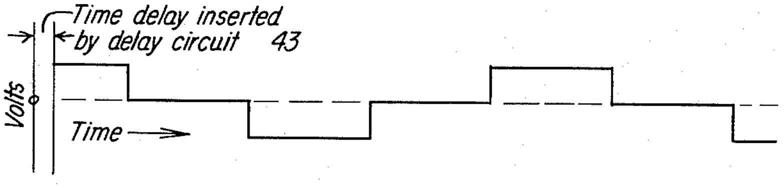
Figure 3C:
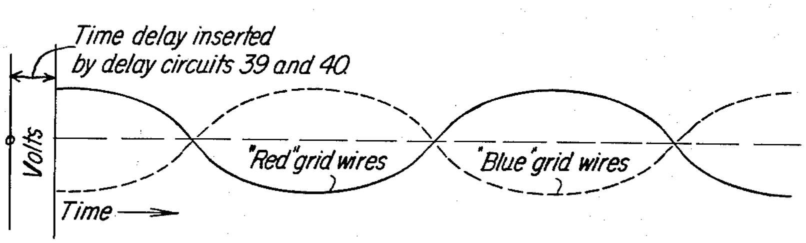

In order to accomplish this deflecting operation, there is applied to the non-grounded plate of the color deflection plates 18 through the delay circuit 43 a reversing-sequence stair-step rectangular wave voltage as shown in Fig. 3B which proceeds from a positive potential to ground potential, to a negative potential, to ground potential, and to the positive potential in each cycle, and which is repeated at the rate of 3.58 megacycles per second. In this manner the electron beam bursts carrying the different color information signals are deflected upon passage between the set of plates 18 and are directed approximately towards the corresponding color strip so that the red information color burst is directed approximately towards a red strip, the green color information burst is directed approximately towards the green strip, and the blue color information burst is directed approximately towards a blue strip during each horizontal line scan. As the color bursts of electrons proceed through the scanning section of the tube, they are accelerated towards the target electrode 21 and deflected in a horizontal and vertical pattern into proximity with particular ones of the grid wires 25 and 26 of the color switching grid 22 where the color bursts of electrons are further deflected and directed towards the corresponding color strip.

Specifically, the "red" color grid wires 25 and the "blue" color grid wires 26 of the color switching grid 22 are driven from a positive voltage to a negative voltage cyclically in a sine wave mode and 180° out of phase with one another and in synchronism with the color information bursts intercepted by the color switching grid 22. The potentials on the set of grid wires 25 and on the set of grid wires 26 are controlled with regard to one another and with regard to the conductive coating 24 of the target electrode 21 so that when a red information color burst of electrons is intercepted by the color switching grid 22, the "red" grid wires 25 are positive with respect to "blue" grid wires 26, and the conductive coating 24 will be positive with respect to the "red" grid wires 25. Accordingly, an electric field is established between the color switching grid 22 and the target electrode 21 so that the intercepted red information color burst of electrons, which at this time is directed approximately toward a particular one of the red phosphor strips, is further deflected, focused, and directed onto the particular one of the red color strips. Similarly, when the color switching grid 22 intercepts a green information color burst of electrons, the set of grid wires 25 is at the same potential as the grid wires 26 and the conductive coating 24 on the target electrode 21 is positive with respect to the sets of grid wires 25 and 26, so that there is produced as between the color switching grid 22 and the target electrode 21 an electric field whereby the green information color burst of electrons, which at this time are directed approximately towards one of the green strips, is further deflected, focused, and directed onto the one of the green color strips. Similarly, when the color switching grid 22 intercepts a blue information color burst of electrons, the "blue" set of grid wires 26 is positive with respect to the "red" set of grid wires 25 and the conductive coating 24 on the target electrode 21 is positive with respect to the "blue" grid wires 26 so that there is established as between the color switching grid 22 and the target electrode 21 an electric field whereby the intercepted blue information color burst of electrons, which at this time is directed approximately towards one of the blue color strips, is further deflected, focused, and directed onto the one blue color strip. Accordingly, color deflection of the electron beam is controlled conjointly by a stair-step square wave applied to the color deflection plates 18 and sine wave voltages applied to the color grid 22 so that the trace position of the electron beam during one horizontal scan line, as shown in Fig. 3D, is a composite of a stair-step square wave and sine wave traversing the red, green and blue color strips of a set of color phosphor strips.

The above described arrangement permits an initial deflection of the electron beam towards a correct phosphor at a position in its path of travel from electron gun to electron target where the required deflection potential is low because of the low beam velocity. This deflection potential is in the form of a rectangular wave, whereby the beam is directed to be incident upon a given phosphor strip for a longer period than is possible through use of the sine wave driven color switching grids alone. In the present embodiment the color switching grids cooperate to complete the color deflection of the beam and to focus the beam onto the phosphor strips of the target electrode 21. Because of the pre-acceleration deflection action of the color deflection plates 18, the directing and focusing process at the color switching grid may be accomplished with less power than was required heretofore.

Figure 3D:
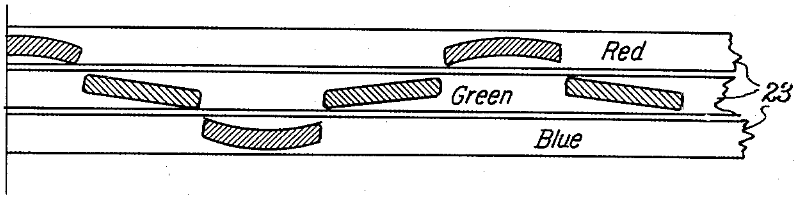

It may be appreciated from a consideration of Fig. 3D, that the green phosphors are excited twice as often as either the red or the blue phosphors during each horizontal line scan so that without equalization the green color would predominate in a reproduced color picture. A balance may be achieved between brightness of the color strips in any number of ways including varying the width of the green strip so as to make it smaller than the red or blue strips, controlling the electron gun source arrangement so that the green information color burst is either of a shorter duration or of a lower density than the red and blue information color bursts, or making the green phosphor less fluorescent by the dilution thereof with an inert substance.

In view of the foregoing it is clear that there has been provided an improved single-gun color television tube arrangement wherein the color switching power demands are low, the power radiated at the color switching frequency is substantially reduced, color registry of the beam is highly accurate, and the screen brightness compares favorably with the theoretically attainable maximum, whereby the definition and brightness of the resultant composite color picture is greatly improved.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a dot-sequential color television system including a picture display tube provided with an electron gun for emitting a beam of electrons, a picture display area composed of an electron target made up of a plurality of horizontally disposed phosphor strips including strips of a first color and of a second color and of a third color arranged in a repeated color-sequence, means for deflecting the beam to scan the target in a horizontal line raster wherein the electron beam traverses a horizontally disposed second color strip during each line scan, and means for modulating the electron beam with first color information pulses and second color information pulses and third color information pulses in the repeated color-sequence; the combination comprising, a deflector in addition to the deflecting means and effective upon the electron beam for the period of each line scan to deflect the electron beam from the scanned second color strip approximately toward the adjacent first color strip during the interval of each first color pulse and from the scanned second color strip approximately toward the adjacent third color strip during the interval of each third color pulse in order to cause the electron beam to be directed approximately toward a first color strip and toward a second color strip and toward a third color strip of the electron target respectively during the corresponding color pulse intervals thereof, a color grid disposed in the electron beam path adjacent to the electron target and including first color grid wires in parallel alignment with the first color strips and third color grid wires in parallel alignment with the third color strips, and a voltage generator for biasing said first color grid wires positive with respect to said third color grid wires during the intervals the electron beam is directed approximately toward one of the first color strips and for biasing said third color grid wires positive with respect to said first color grid wires during the intervals the electron beam is directed approximately toward one of the third color strips in order to cause the electron beam to be further deflected and accurately directed onto a first color strip and onto a second color strip and onto a third color strip of the electron target respectively during the corresponding color pulse intervals thereof, whereby the first color and the second color and the third color modulated portions of the electron beam register accurately respectively on a first color strip and on a second color strip and on a third color strip of the electron target to produce in composite a color picture display.

2. In a dot-sequential color television system including a picture display tube provided with an electron gun for emitting a beam of electrons, a picture display area composed of an electron target made up of a plurality of horizontally disposed phosphor strips including strips of a first color and of a second color and of a third color arranged in a repeated color-sequence, means for deflecting the beam to scan the target in a horizontal line raster wherein the electron beam traverses a horizontally disposed second color strip during each line scan, and means for modulating the electron beam with first color information pulses and second color information pulses and third color information pulses in the repeated color-sequence; the combination comprising, an electron beam deflector in addition to the deflecting means and closely adjacent to the electron gun, a color grid disposed in the electron beam path closely spaced from the electron target and including first color grid wires in parallel alignment with the first color strips and third color grid wires in parallel alignment with the third color strips, a first voltage generator effective during the period of each line scan for energizing the deflector to deflect the electron beam from the scanned second color strip approximately toward the adjacent first color strip during the interval of each first color pulse and from the scanned second color strip approximately toward the adjacent third color strip during the interval of each third color pulse in order to cause the electron beam to be directed approximately toward the adjacent first color strip and toward the scanned second color strip and toward the adjacent third color strip respectively during the corresponding color pulse intervals thereof, and a second voltage generator for biasing said first color grid wires positive with respect to said third color grid wires during the intervals the electron beam is directed approximately toward one of the first color strips and for biasing said third color grid wires positive with respect to said first color grid wires during the intervals the electron beam is directed approximately toward one of the third color strips in order to cause the electron beam to be further deflected and accurately directed onto a first color strip and onto a second color strip and onto a third color strip of the electron target respectively during the corresponding color pulse intervals thereof, whereby the first color and the second color and the third color modulated portions of the electron beam register accurately respectively on a first color strip and on a second color strip and on a third color strip of the electron target to produce in composite a color picture display.

3. In a dot-sequential color television system including a picture display tube provided with an electron gun for emitting a beam of electrons, a picture display area composed of an electron target biased with respect to the electron gun for attracting the electrons emitted therefrom and made up of a plurality of horizontally disposed phosphor strips including strips of a first color and of a second color and of a third color arranged in a repeated color-sequence, means for deflecting the beam to scan the target in a horizontal line raster wherein the electron beam traverses a horizontal disposed second color strip during each line scan, and means for modulating the electron beam with first color information pulses and second color information pulses and third color information pulses in the repeated color-sequence; the combination comprising, an electron beam deflector in addition to the deflecting means and closely adjacent to the electron gun, a color grid disposed in the electron beam path closely spaced from the electron target and biased intermediate with regard to the electron gun and the electron target and including first color grid wires in parallel alignment with the first color strips and third color grid wires in parallel alignment with the third color strips, a first voltage generator effective during the period of each line scan for energizing said deflector to deflect the electron beam from the scanned second color strip approximately toward the adjacent first color strip during the interval of each first color pulse and from the scanned second color strip approximately toward the adjacent third color strip during the interval of each third color pulse in order to cause the electron beam to be directed approximately toward the adjacent first color strip and toward the scanned second color strip and toward the adjacent third color strip respectively during the corresponding color pulse intervals thereof, and a second voltage generator for biasing said first color grid wires positive with respect to said third color grid wires during the intervals the electron beam is directed approximately toward one of the first color strips and for biasing said third color grid wires positive with respect to said first color grid wires during the intervals the electron beam is directed approximately toward one of the third color strips in order to cause the electron beam to be further deflected and accurately focused onto a first color strip and onto a second color strip and onto a third color strip of the electron target respectively during the corresponding color pulse intervals thereof, whereby the first color and the second color and the third color modulated portions of the electron beam register accurately respectively on a first color strip and on a second color strip and on a third color strip of the electron target to produce in composite a color picture display.

4. In a dot-sequential color television system including a picture display tube provided with an electron gun for emitting a beam of electrons, a picture display area composed of an electron target biased with respect to the electron gun for attracting the electrons emitted therefrom and made up of a plurality of horizontally disposed phosphor strips including strips of a first color and of a second color and of a third color arranged in a reversing color-sequence, and means for deflecting the beam to scan the target in a horizontal line raster wherein the electron beam traverses a horizontally disposed second color strip during each line scan, and means for modulating the electron beam with first color information pulses and second color information pulses and third color information pulses in the reversing color-sequence; the combination comprising, an electron beam deflector in addition to the deflecting means and closely adjacent to the deflecting means, a color grid disposed in the electron beam path closely spaced from the electron target and biased intermediate with regard to the electron gun and the electron target and including first color grid wires in parallel alignment with the first color strips and third color grid wires in parallel alignment with the third color strips, a rectangular wave voltage generator effective during the period of each line scan for energizing said deflector to deflect the electron beam from the scanned second color strip approximately toward the adjacent first color strip during the interval of each first color pulse and from the scanned second color strip approximately toward the adjacent third color strip during the interval of each third color pulse in order to cause the electron beam to be directed approximately toward the adjacent first color strip and toward the scanned second color strip and toward the adjacent third color strip respectively during the corresponding color pulse intervals thereof, and a sine wave voltage generator biasing said first color grid wires positive with respect to said third color grid wires during the intervals the electron beam is directed approximately toward one of the first color strips and for biasing said third color grid wires positive with respect to said first color grid wires during the intervals the electron beam is directed approximately toward one of the third color strips in order to cause the electron beam to be further deflected and accurately focused onto a first color strip and onto a second color strip and onto a third color strip of the electron target respectively during the corresponding color pulse intervals thereof and to dwell upon the corresponding color phosphor strip during substantially the entire period during the corresponding color pulse interval, whereby the first color and the second color and the third color modulated portions of the electron beam register accurately respectively on a first color strip and on a second color strip and on a third color strip of the electron target to produce in composite a color picture display.

5. In a dot-sequential color television system including a picture display tube provided with an electron gun for emitting a beam of electrons, a picture display area composed of an electron target biased highly positive with respect to the electron gun for accelerating thereto the electrons emitted from the gun and made up of a plurality of horizontally disposed red phosphor strips and green phosphor strips and blue phosphor strips arranged side-by-side in a reversing color-sequence, means for deflecting the beam to scan the target in a horizontal line raster wherein the electron beam traverses a horizontally disposed green phosphor strip during each line scan, and means for modulating the electron beam with red color information pulses and green color information pulses and blue color information pulses in the reversing color-sequence; the combination comprising, an electron beam deflector in addition to the deflecting means and closely adjacent to the deflecting means, a color grid disposed in the electron beam path closely spaced from the electron target and including a first set of grid wires in parallel alignment with the red phosphor strips and a second set of grid wires interleaved with the grid wires of said first set and in parallel alignment with the blue phosphor strips, an inductor terminating at one terminal thereof said first set of grid wires and terminating at the other terminal thereof said second set of grid wires and biased at the midpoint thereof to a voltage intermediate to the electron gun voltage and the target electrode voltage, a rectangular wave voltage generator effective during the period of each line scan for energizing said deflector to deflect the electron beam from the scanned green phosphor strip approximately toward the adjacent red phosphor strip during the interval that each red color pulse of electrons traverses the control field of the electron beam deflector and from the scanned green phosphor strip approximately toward the adjacent blue phosphor strip during the interval each blue color pulse of electrons traverses the control field of the electron beam deflector in order to cause the electron beam to be directed approximately toward the adjacent red color strip and toward the scanned green phosphor strip and toward the adjacent blue phosphor strip respectively during the corresponding color pulse intervals thereof, and a sine wave generator coupled to said inductor for biasing said first set of grid wires slightly positive with respect to said second set of grid wires during each interval one of the red color pulses of electrons intercepts said color grid and for biasing said second set of grid wires slightly positive with respect to said first set of grid wires during each interval one of the blue color pulses of electrons intercepts said color grid in order to cause the electron beam to be further deflected and accurately focused onto a red phosphor strip and onto a green phosphor strip and onto a blue phosphor strip of the electron target respectively during the corresponding color pulse intervals thereof to dwell upon the corresponding phosphor color strip during substantially the entire period during the corresponding color pulse interval, whereby the red and the green and the blue color modulated portions of the electron beam register accurately respectively on a red and on a green and on a blue phosphor strip of the electron target to produce in composite a color picture display.

6. The color television system combination set forth in claim 5, wherein said electron beam deflector comprises a pair of electrostatic deflection plates.

7. In a color television system wherein a picture display tube is provided with an electron gun for emitting a beam of electrons, a picture display area composed of an electron target made up of a plurality of phosphor areas each of a size less than that of an image point to be reproduced including areas of a first color and of a second color and of a third color arranged in a repeated color-sequence, means for deflecting the beam to scan the target in a line raster wherein the electron beam traverses a color area during each line scan, and means for modulating the electron beam with first color information pulses and second color information pulses and third color information pulses in the repeated color-sequence; the combination comprising, a deflector in addition to the deflecting means and effective upon the electron beam for the period of each line scan to deflect the electron beam approximately toward the first color area during the interval of each first color pulse and approximately toward the second color area during the interval of each second color pulse and approximately toward the adjacent third color area during the interval of each third color pulse, a color grid disposed in the electron beam path adjacent to the electron target and including first color grid wires in alignment with the first color areas and third color grid wires in alignment with the third color areas, and a voltage generator for biasing said first color grid wires positive with respect to said third color grid wires during the intervals the electron beam is directed approximately toward one of the first color areas and for biasing said third color grid wires positive with respect to said first color grid wires during the intervals the electron beam is directed approximately toward one of the third color areas in order to insure the electron beam to be further deflected and accurately directed onto a first color area and onto a second color area and onto a third color area of the electron target respectively during the corresponding color pulse intervals thereof, whereby the first color and the second color and the third color modulated portions of the electron beam register accurately respectively on a first color area and on a second color area and on a third color area of the electron target to produce in composite a color picture display.

8. The combination as set forth in claim 7, wherein the deflector deflects the electron beam stepwise from one color area to the next whereby to provide maximum dwell time on each color area.

9. In a color television system wherein a picture display tube is provided with an electron gun for emitting a beam of electrons, a picture display area composed of an electron target made up of a plurality of phosphor strips including strips of a first color and of a second color and of a third color arranged in a repeated color-sequence, means for deflecting the beam to scan the target in a line raster wherein the electron beam traverses a color strip during each line scan, and means for modulating the electron beam with first color information pulses and second color information pulses and third color information pulses in the repeated color-sequence; the combination comprising, a deflector in addition to the deflecting means and effective upon the electron beam for the period of each line scan to deflect the electron beam approximately toward the first color strip during the interval of each first color pulse and approximately toward the second color strip during the interval of each second color pulse and approximately toward the adjacent third color strip during the interval of each third color pulse, a color grid disposed in the electron beam path adjacent to the electron target and including first color grid wires in parallel alignment with the first color strip and third color grid wires in parallel alignment with the third color strip, and a voltage generator for biasing said first color grid wires positive with respect to said third color grid wires during the intervals the electron beam is directed approximately toward one of the first color strips and for biasing said third color grid wires positive with respect to said first color grid wires during the intervals the electron beam is directed approximately toward one of the third color strips in order to insure the electron beam to be further deflected and accurately directed onto a first color strip and onto a second color strip and onto a third color strip of the electron target respectively during the corresponding color pulse intervals thereof, whereby the first color and the second color and the third color modulated portions of the electron beam register accurately respectively on a first color strip and on a second color strip and on a third color strip of the electron target to produce in composite a color picture display.

10. The combination as set forth in claim 9, wherein the deflector deflects the electron beam stepwise from one color strip to the next whereby to provide maximum dwell time on each color strip, and the output of the voltage generator for biasing the color grid wires is sinusoidal.

11. A single gun color television picture display tube comprising an electron gun for emitting a beam of electrons, a picture display area composed of an electron target made up of a plurality of phosphor areas each of a size less than that of an image point to be reproduced including areas of a first color and of a second color and of a third color arranged in a repeated color-sequence, means for deflecting the beam to scan the target in a line raster wherein the electron beam transverses a color area during each line scan, means for modulating the electron beam with first color information pulses and second color information pulses and third color information pulses in the repeated color sequence, a deflector in addition to the deflecting means and positioned adjacent to said electron gun effective upon the electron beam for a period of each line scan to deflect the electron beam approximately toward the first color area during the interval of each first color pulse and approximately toward the second color area during the interval of each second color pulse and approximately toward the third color area during the interval of each third color pulse, a color grid disposed in the electron beam path adjacent to the electron target and including first color grid wires in alignment with said first color areas and third color grid wires in alignment with said third color areas, and means interconnecting said first color grid wires and providing a voltage connection therefor and separate means interconnecting said third color grid wires and providing a voltage connection therefor.

12. A single gun color television picture display tube comprising an electron gun for emitting a beam of electrons, a picture display area composed of an electron target made up of a plurality of phosphor strips including strips of a first color and of a second color and of a third color arranged in a repeated color-sequence, means for deflecting the beam to scan the target in a line raster wherein the electron beam traverses a second color strip during each line scan, means for modulating the electron beam with first color information pulses and second color information pulses and third color information pulses in a repeated color-sequence, a deflector in addition to the deflecting means and positioned between said electron gun and said deflecting means effective upon the electron beam for the period of each line scan to deflect the electron beam from said scanned second color strip approximately toward said first color strip during the interval of each first color pulse and approximately toward said scanned second color strip during the interval of each second color pulse and approximately toward the third color strip during the interval of each third color pulse, a color grid disposed in the electron beam path adjacent to and closely spaced from said electron target and including first color grid wires in parallel alignment with said first color strips and third color grid wires in parallel alignment with said third color strips, said first color grid wires being interlaced with said third color grid wires, and means interconnecting said first color grid wires and providing a voltage connection therefor and separate means interconnecting said third color grid wires and providing a voltage connection therefor.

13. A single gun color television picture display tube comprising an electron gun for emitting a beam of electrons, a picture display area composed of an electron target made up of a plurality of horizontally disposed phosphor strips including strips of a first color and of a second color and of a third color arranged in a reversing color-sequence, means for deflecting the beam to scan said target in a horizontal line raster wherein the electron beam traverses a horizontally disposed second color strip during each line scan, means for modulating the electron beam with first color information pulses and second color information pulses and third color information pulses in the reversing color-sequence, an electron beam deflector in addition to the deflecting means and closely adjacent to said electron gun and disposed between said electron gun and said deflecting means effective upon the electron beam for the period of each line scan to deflect the electron beam approximately toward the first color strip during the interval of each first color pulse and approximately toward the scanned second color strip during the interval of each second color pulse and toward the third color strip during the interval of each third color pulse, a color grid disposed in the electron beam path adjacent to and closely spaced from said electron target and including first color grid wires in parallel alignment with said first color strips and third color grid wires in parallel alignment with said third color strips, said first color grid wires being interlaced with said third color grid wires, and means interconnecting said first color grid wires and providing a voltage connection therefor and separate means interconnecting said third color grid wires and providing a voltage connection therefor.

References Cited in the file of this patent

UNITED STATES PATENTS

| | | |
|---|---|---|
| 2,671,129 | Moore | Mar. 2, 1954 |
| 2,677,723 | McCoy et al. | May 4, 1954 |
| 2,734,940 | Loughlin | Feb. 14, 1956 |
| 2,744,952 | Lawrence | May 8, 1956 |
| 2,745,037 | Rynn | May 8, 1956 |
| 2,763,715 | Fromm | Sept. 18, 1956 |
| 2,773,118 | Moore | Dec. 4, 1956 |

OTHER REFERENCES

Compatible Color Picture Presentation With the Single Gun Tricolor Chromatron, Proceedings of the I.R.E., vol. 42, No. 1, January 1954.

UNITED STATES PATENT OFFICE
CERTIFICATION OF CORRECTION

Patent No. 2,972,014 February 14, 1961

Herbert E. Welch

It is hereby certified that error appears in the above numbered patent requiring correction and that the said Letters Patent should read as corrected below.

Column 11, line 69, for "transverses" read -- traverses --.

Signed and sealed this 4th day of July 1961.

(SEAL)
Attest:

ERNEST W. SWIDER
Attesting Officer

DAVID L. LADD
Commissioner of Patents

UNITED STATES PATENT OFFICE

CERTIFICATION OF CORRECTION

Patent No. 2,972,014 February 14, 1961

Herbert E. Welch

It is hereby certified that error appears in the above numbered patent requiring correction and that the said Letters Patent should read as corrected below.

Column 11, line 69, for "transverses" read -- traverses --.

Signed and sealed this 4th day of July 1961.

(SEAL)
Attest:

ERNEST W. SWIDER
Attesting Officer

DAVID L. LADD
Commissioner of Patents